Sept. 30, 1941.  E. McCORMICK  2,257,614
INTERNAL COMBUSTION ENGINE
Filed July 13, 1940

INVENTOR:
ELMER McCORMICK
BY
ATTORNEYS.

Patented Sept. 30, 1941

2,257,614

UNITED STATES PATENT OFFICE 2,257,614

INTERNAL COMBUSTION ENGINE

Elmer McCormick, Waterloo, Iowa, assignor to John Deere Tractor Company, Waterloo, Iowa, a corporation of Iowa Application July 13, 1940, Serial No. 345,332

7 Claims. (Cl. 123—191)

The present invention relates generally to internal combustion engines and has as its principal object the provision of a cylinder head of novel design which produces an increased turbulence and therefore more rapid and complete combustion of the fuel mixture charge in the cylinder, thus assuring high efficiency and smooth operation of the engine.

Figure 1:
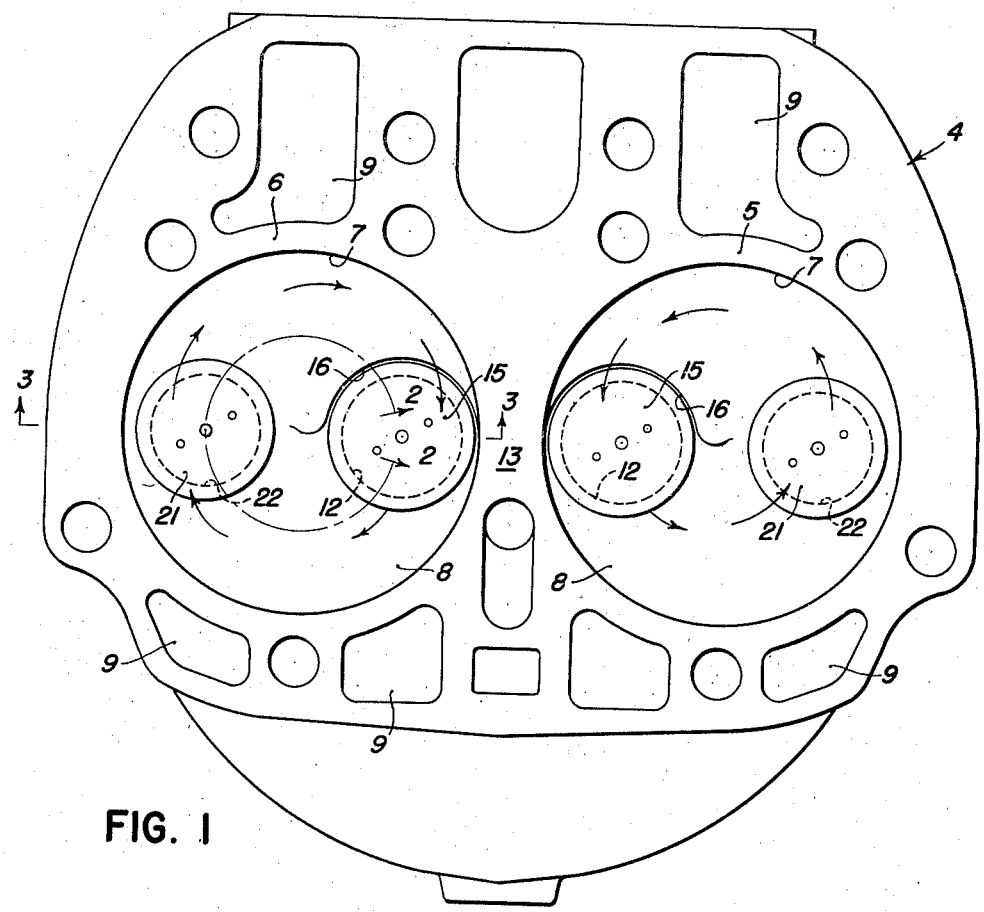
Figure 2:
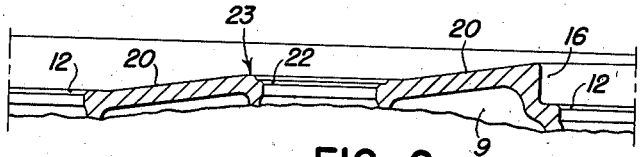
Figure 3:
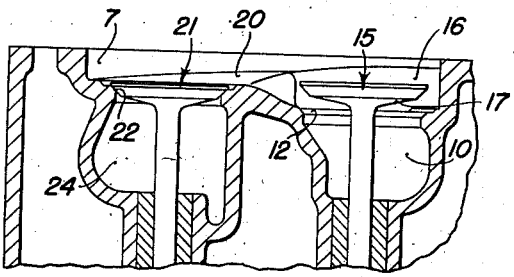

This and other objects and advantages of this invention will be apparent to those skilled in the art after a consideration of the following description in which reference is had to the drawing appended hereto, in which Figure 1 is a plan view of the interior of a cylinder head embodying the principles of this invention;

Figure 2 is a development of a fragmentary sectional view of the head wall in one of the cylinders taken along an arc 2—2 in Figure 1; and Figure 3 is a sectional elevational view taken through the intake and exhaust valves along a line 3—3 in Figure 1.

The embodiment of the invention shown and described herein, by way of example, is that of an internal combustion engine of the aspiration type in which a mixture of air and vaporized fuel is drawn into the cylinders and is there ignited by any suitable means such as a spark plug, the burned gases being forced through an exhaust valve during the return stroke of the piston. It is to be understood, however, that this invention is not limited to this particular type of engine, for after a study of this disclosure, other applications, such as in fuel injection engines of the Diesel type, will be apparent to those skilled in the art. As is evident from the cylinder head 4 shown in Figure 1, the engine comprises a pair of cylinders 5, 6, each having a combustion chamber 7 including a generally circular cylinder head wall 8 at one end thereof. The cylinders 5, 6 are disposed adjacent one another and are surrounded by the usual water jacket defining pasages 9 for conducting cooling water around the cylinders, as will be understood by those skilled in the art. The cylinder head 4 is also provided with a fuel intake passage 10 which communicates with an intake opening 12 in each cylinder which is formed to provide an annular valve seat disposed in the head wall 8 adjacent the central wall 13 between the two cylinders 5, 6. An intake valve 15 of the mushroom type is seated in the valve seat 12 and during the intake stroke of the engine the intake valve 15 is raised from its seat 12 by suitable camming means (not shown) of conventional design, and thus providing an annular opening between the valve and seat through which the charge of fuel mixture flows into the combustion chamber.

A cut-off wall 16 embraces one side of the valve seat 12 and valve 15 around approximately one-half the circumference thereof and extends axially of the cylinder from the valve seat a distance of at least the length of stroke of the valve. The cut-off wall 16 is disposed close enough to the valve 15 that the fuel charge is prevented from flowing into the combustion chamber through that portion of the valve seat, thereby causing the charge to flow through the valve seat at the side opposite the cut-off wall. The charge is directed by the under surface 17 of the valve 15 from the valve seat in a flat stream substantially in a plane perpendicular to the axis of the cylinder. The charge is guided by the cylinder wall into a circular path around the combustion chamber 7 as indicated by the arrows in Figure 1. As the charge whirls around the combustion chamber it is also guided in an axial direction outwardly from the intake valve seat 12 by means of a ramp 20, which begins directly adjacent the edge of the valve seat 12 on the side opposite the cut-off wall 16, and rises in a substantially continuous uniform helical curve about the head wall of the combustion chamber to the edge of the cut-off wall 16. Every radius line on the surface of the ramp is substantially perpendicular to the major axis of the cylinder. Inasmuch as the edge of the cut-off wall is outward of the plane of the outer surface of the intake valve 15 when the latter is in raised position, the charge passes over the intake valve as it whirls about the combustion chamber, and thus does not retard the flow of the incoming charge through the intake valve seat.

Diametrically opposite the intake valve 15 is an exhaust valve 21 which fits into a valve seat 22, the latter being set into the head wall at a point part way up the slope of the ramp 20. The ramp 20 is leveled off at the valve seat 22 in a plane parallel to the plane of the intake valve seat, so that the valve seats are in parallel planes, but the exhaust valve seat is spaced axially outwardly from the intake valve seat, as shown.

An exhaust duct 24 communicates with each of the exhaust valves for leading the burnt gases out of the cylinders when the exhaust valves 21 are opened.

I claim:

1. In combination in an internal combustion engine, a cylinder having a combustion chamber including a generally circular head wall at one end thereof, an intake valve seat in said head wall, a valve therefor, and a helical ramp on said head wall beginning adjacent one side of said valve seat, curving substantially uniformly and continuously about said head wall, and terminating adjacent the opposite side of said valve seat but spaced axially therefrom.

2. In combination in an internal combustion engine, a cylinder having a combustion chamber including a generally circular head wall at one end thereof, an intake valve seat in said head wall, a mushroom type valve therefor, a cut-off wall on said head wall embracing one side of said valve seat, said wall extending axially of said cylinder from said valve seat a distance of at least the length of stroke of said valve, whereby the charge is directed from the opposite side of said valve seat, and a helical ramp on said end wall beginning adjacent said opposite side of the valve seat and rising substantially uniformly as it curves around said head wall to the edge of said cut-off wall.

3. In combination in an internal combustion engine, a cylinder having a combustion chamber including a generally circular head wall at one end thereof, an intake valve seat in said head wall, a valve therefor, and a helical ramp on said head wall beginning adjacent one side of said valve seat, curving substantially uniformly and continuously about said head wall, and terminating adjacent the opposite side of said valve seat but spaced axially therefrom, an exhaust valve seat in said ramp intermediate of the latter and disposed in a plane spaced from the plane of said intake valve seat, and an exhaust valve for said exhaust valve seat.

4. In combination in an internal combustion engine, a cylinder having a combustion chamber including a generally circular head wall at one end thereof, an intake valve seat in said head wall, a mushroom type valve therefor, a cut-off wall on said head wall embracing one side of said valve seat, said wall extending axially of said cylinder from said valve seat a distance of at least the length of stroke of said valve, whereby the charge is directed from the opposite side of said valve seat, and a helical ramp on said end wall beginning adjacent said opposite side of the valve seat and rising substantially uniformly as it curves around said head wall to the edge of said cut-off wall, an exhaust valve seat intermediate of said ramp and disposed in a plane spaced axially outwardly from the plane of said intake valve seat, and a valve for said exhaust valve seat.

5. In combination in an internal combustion engine, a cylinder having a combustion chamber including a head wall at one end thereof, a pair of valve seats disposed in said wall in axially spaced planes, and a ramp in said wall between said seats.

6. In combination in an internal combustion engine, a cylinder having a combustion chamber including an end wall, a pair of valve seats disposed in said wall, said seats being disposed in substantially parallel planes which are perpendicular to the major axis of said cylinder and spaced from each other in an axial direction, and a ramp in said wall connecting said seats.

7. In combination in an internal combustion engine, a cylinder having a combustion chamber including an end wall, said wall having a pair of intake and exhaust openings therein disposed in portions of said wall which lie in planes spaced axially of said cylinder from one another, a pair of valves adapted to seat in said openings, and a helical ramp in said wall extending around the latter from one side of one of said openings beyond the other opening to the opposite side of said one opening in axially spaced relation thereto.

ELMER McCORMICK.